US012597864B2

(12) United States Patent
Guo et al.

(10) Patent No.: US 12,597,864 B2
(45) Date of Patent: Apr. 7, 2026

(54) CONTROLLER AND ISOLATED POWER CONVERTER

(71) Applicant: SHANGHAI BRIGHT POWER SEMICONDUCTOR CO., LTD., Shanghai (CN)

(72) Inventors: Yanmei Guo, Shanghai (CN); Yihui Chen, Shanghai (CN); Xiaoru Gao, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 220 days.

(21) Appl. No.: 18/643,327

(22) Filed: Apr. 23, 2024

(65) Prior Publication Data

US 2024/0356446 A1 Oct. 24, 2024

(30) Foreign Application Priority Data

Apr. 24, 2023 (CN) .......................... 202320950223.9

(51) Int. Cl.
*H02M 3/335* (2006.01)
*H02M 1/00* (2006.01)
*H02M 3/07* (2006.01)

(52) U.S. Cl.
CPC ..... *H02M 3/33523* (2013.01); *H02M 1/0006* (2021.05); *H02M 3/07* (2013.01); *H02M 3/33592* (2013.01)

(58) Field of Classification Search
CPC .. H02M 3/33523; H02M 1/0006; H02M 3/07; H02M 3/33592
See application file for complete search history.

(56) References Cited

U.S. PATENT DOCUMENTS

| 11,258,369 | B2 * | 2/2022 | Odell | ................. | H02M 1/0006 |
| 2014/0204623 | A1 * | 7/2014 | Djenguerian | ..... | H02M 3/33523 |
| | | | | | 363/21.12 |

* cited by examiner

*Primary Examiner* — Adolf D Berhane
(74) *Attorney, Agent, or Firm* — MUNCY, GEISSLER, OLDS & LOWE, P.C.

(57) ABSTRACT

A controller and an isolated power converter are disclosed. The controller includes: a bypass terminal coupled to a bypass capacitor; a first power circuit coupled to the bypass terminal and a first terminal, the first terminal configured to transfer electric charge from the first terminal to the bypass terminal; a second power circuit coupled to the first terminal, a second terminal and a third terminal, the second and third terminals coupled to a flying capacitor, the second power circuit configured to transfer electric charge from the first terminal to the flying capacitor; and a charging control circuit coupled to control the first or second power circuit to transfer electric charge to the bypass terminal, in response to at least one of a voltage at the bypass terminal and a voltage at the first terminal. The present invention eliminates influence of switching frequency variation and reduces sensitivity to an output voltage.

15 Claims, 7 Drawing Sheets

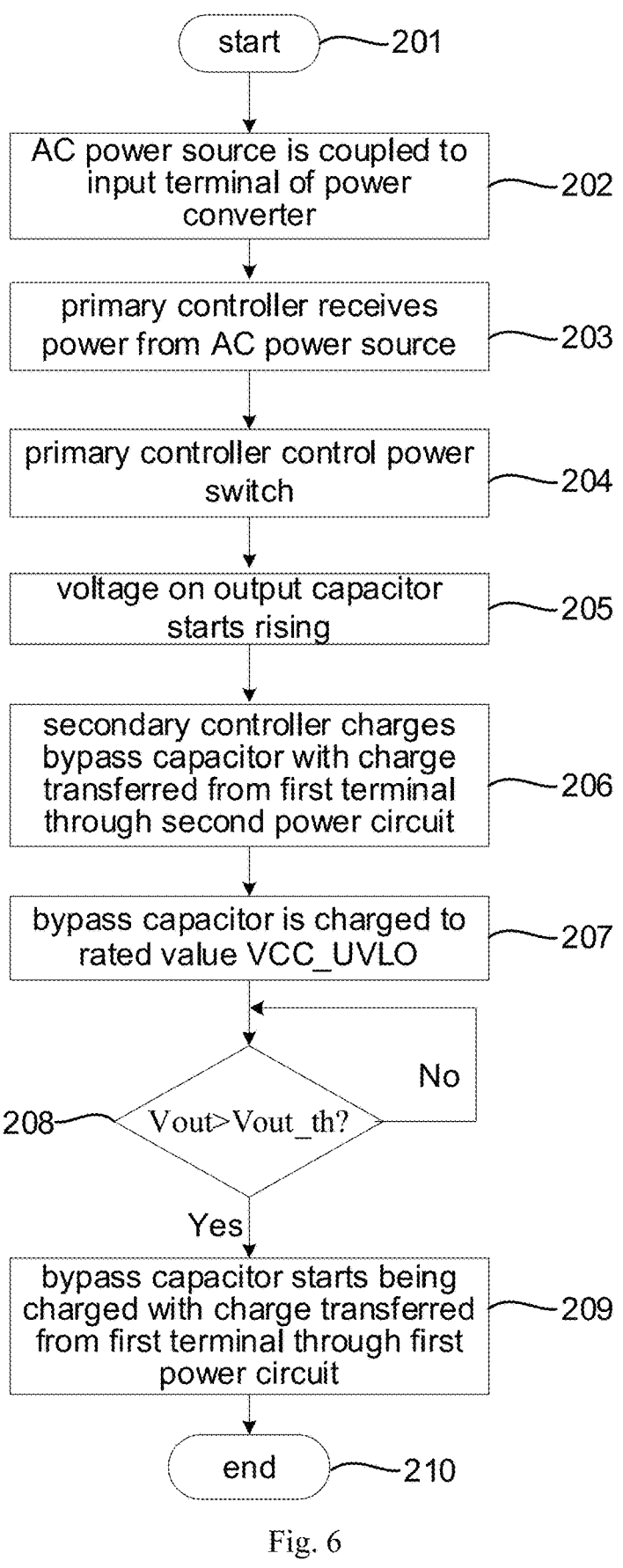

start —201

AC power source is coupled to input terminal of power converter —202 primary controller receives power from AC power source —203 primary controller control power switch —204 voltage on output capacitor starts rising —205 secondary controller charges bypass capacitor with charge transferred from first terminal through second power circuit —206 bypass capacitor is charged to rated value VCC_UVLO —207

208— Vout>Vout_th?          No

Yes bypass capacitor starts being charged with charge transferred from first terminal through first power circuit —209 end —210

Fig. 6

CONTROLLER AND ISOLATED POWER CONVERTER

CROSS-REFERENCES TO RELATED APPLICATION

This application claims the priority of Chinese patent application number 202320950223.9, filed on Apr. 24, 2023, the entire contents of which are incorporated herein by reference.

TECHNICAL FIELD

The present invention relates to the field of semiconductor integrated circuits (ICs) and, in particular, to a controller and an isolated power converter.

BACKGROUND

In conventional isolated switched-mode power supplies (such as power converters), both primary and secondary sides of a transformer are controlled using a semiconductor power circuit. FIG. 1 is a schematic illustration of an isolated power converter. Referring to FIG. 1, a first IC chip (Die1) is provided at the primary side of the transformer, and a second IC chip (Die2) at the secondary side. In case of a flyback circuit and synchronous rectification control, the first IC chip is mainly adapted to control a primary-side power MOS transistor through which a flyback current flows, and the second IC chip is mainly used to control a secondary-side synchronous rectification MOS transistor.

In such applications, as shown in FIGS. 2a to 2c, there are mainly three power supply schemes for the second IC chip. In the power supply scheme of FIG. 2a, power is supplied by an output voltage Vout. Although this scheme is efficient, VCC may experience an undervoltage condition in response to a drop in the output voltage. In the power supply scheme of FIG. 2b, power is supplied by a voltage Forw across a secondary-side winding. This scheme is inefficient, and VCC may also experience an undervoltage condition at a low switching frequency. In the power supply scheme of FIG. 2c, power is supplied by Forw and Vout. Despite high efficiency, this scheme is also disadvantageous in an undervoltage condition when both the output voltage and switching frequency are low.

SUMMARY

It is an objective of the present invention to provide a controller and an isolated power converter, which is immune from the influence of a switching frequency and thus less sensitive to an output voltage.

To this end, a controller is provided in a first aspect of the present invention, which includes:

a bypass terminal coupled to a bypass capacitor which is in turn coupled to a secondary side of an isolated power converter;

a first power circuit coupled to the bypass terminal and a first terminal, the first terminal coupled to a secondary-side node, the first power circuit coupled to transfer electric charge from the first terminal to the bypass terminal so that it is stored in the bypass capacitor;

a second power circuit coupled to the first terminal, a second terminal and a third terminal, the second and third terminals respectively coupled two terminals of a flying capacitor, the second power circuit coupled to transfer the electric charge from the first terminal to the flying capacitor and from the flying capacitor to the bypass terminal so that it is stored in the bypass capacitor; and a charging control circuit, which is coupled to control the first or second power circuit to transfer the electric charge to the bypass terminal in response to at least one of a bypass voltage at the bypass terminal and a voltage at the first terminal.

Optionally, the secondary-side node may be an output node of the isolated power converter, at which a regulated output voltage is output, and the voltage at the first terminal may reflect the regulated output voltage.

Optionally, the charging control circuit may be coupled to provide a first control signal to the first power circuit, wherein the charging control circuit is coupled to provide a second control signal to the second power circuit; when the first control signal is a valid signal, the first power circuit transfers the electric charge to the bypass terminal; and when the second control signal is a valid signal, the second power circuit transfers the electric charge to the bypass terminal.

Optionally, the charging control circuit may include a comparator and a NOT gate, wherein the voltage at the first terminal is input to a positive input terminal of the comparator; a first threshold voltage is input to a negative input terminal of the comparator; the first control signal is output from an output terminal to the first power circuit, which is connected to an input terminal of the NOT gate; and the second control signal is output from an output terminal of the NOT gate to the second power circuit.

Optionally, the charging control circuit may be coupled to control the first or second power circuit to transfer the electric charge to the bypass terminal in response to a result of comparison made between the voltage at the first terminal and the first threshold voltage.

Optionally, when the voltage at the first terminal is higher than the first threshold voltage, the first power circuit may transfer the electric charge from the first terminal to the bypass terminal. Alternatively, when the voltage at the first terminal is lower than the first threshold voltage, the second power circuit may transfer the electric charge from the first terminal to the bypass terminal.

Optionally, the charging control circuit may include two comparators, two AND gates and one NOT gate, wherein the voltage at the first terminal is input to a positive input terminal of a first one of the comparators; the first threshold voltage is input to a negative input terminal of the first comparator; an output terminal of the first comparator is connected to an input terminal of a first one of the AND gates and to an input terminal of the NOT gate; the bypass voltage is input to a negative input terminal of a second one of the comparators; a second threshold voltage is input to a positive input terminal of the second comparator; an output terminal of the second comparator is connected to another input terminal of the first AND gate and an input terminal of a second one of the AND gates; the first control signal is output from an output terminal of the first AND gate to the first power circuit; an output terminal of the NOT gate is connected to another input terminal of the second AND gate; and the second control signal is output from an output terminal of the second AND gate to the second power circuit.

Optionally, the charging control circuit may be coupled to control the first or second power circuit to transfer the electric charge to the bypass terminal in response to a result of comparison made between the voltage at the first terminal and the first threshold voltage and to a result of comparison made between the bypass voltage at the bypass terminal and the second threshold voltage.

Optionally, when the voltage at the first terminal is higher than the first threshold voltage and when the bypass voltage is lower than the second threshold voltage, the first power circuit may transfer the electric charge from the first terminal to the bypass terminal. Alternatively, when the voltage at the first terminal is lower than the first threshold voltage and when the bypass voltage is lower than the second threshold voltage, the second power circuit may transfer the electric charge from the first terminal to the bypass terminal.

Optionally, the controller may further include a secondary control circuit, which is coupled to the first terminal to transmit a voltage signal at the first terminal to a primary side of the isolated power converter.

To the above end, an isolated power converter including the controller as defined above is provided in a second aspect of the present invention.

In summary, the present invention provides a controller and an isolated power converter. The controller includes a bypass terminal coupled to a bypass capacitor, which is in turn coupled to a secondary side of the isolated power converter. The controller also includes a first power circuit coupled to the bypass terminal and a first terminal. The first terminal is coupled to a secondary-side node, and the first power circuit is coupled to transfer electric charge from the first terminal to the bypass terminal so that it is stored in the bypass capacitor. The controller further includes a second power circuit coupled to the first terminal, a second terminal and a third terminal. The second terminal and the third terminal are respectively coupled to two terminals of a flying capacitor, and the second power circuit is coupled to transfer electric charge from the first terminal to the flying capacitor and from the flying capacitor to the bypass terminal so that it is stored in the bypass capacitor. The controller further includes a charging control circuit, which is coupled to control the first or second power circuit to transfer electric charge to the bypass terminal, in response to at least one of a bypass voltage generated at the bypass terminal and a voltage at the first terminal. According to the present invention, the charging control circuit transfers electric charge from the first terminal to the bypass terminal selectively through the first or second power circuit so that it is stored in the bypass capacitor to supply power to the controller. This enables high charging efficiency, eliminates the influence of switching frequency variation during startup and operation of the isolated power converter, and reduces sensitivity to an output voltage.

BRIEF DESCRIPTION OF THE DRAWINGS

Those of ordinary skill in the art would appreciate that the accompanying drawings are provided to facilitate a better understanding of the present invention and do not limit the scope thereof in any sense, in which:

FIG. 6 schematically illustrates a power supply process during startup of an isolated power converter according to an embodiment of the present invention;

DETAILED DESCRIPTION

Objectives, advantages and features of the present invention will become more apparent upon reading the following more detailed description of specific embodiments thereof with reference to the accompanying drawings. Note that the figures are provided in a very simplified form not necessarily drawn to exact scale and for the only purpose of facilitating easy and clear description of the embodiments. In addition, the structures shown in the figures are usually part of actual structures. In particular, as the figures tend to have distinct emphases, they are often drawn to different scales.

As used herein, the singular forms "a", "an" and "the" include plural referents, unless the context clearly indicates otherwise. As used herein, the term "or" is generally employed in the sense of "and/or", unless the context clearly indicates otherwise. As used herein, the term "a number of" is generally employed in the sense of "at least one", unless the context clearly indicates otherwise. As used herein, the term "at least two" is generally employed in the sense of "two or more", unless the context clearly indicates otherwise. Additionally, the use of the terms "first", "second" and "third" herein is intended for illustration only and is not to be construed as denoting or implying relative importance or as implicitly indicating a numerical number of the referenced items. Accordingly, defining an item with "first", "second" or "third" is an explicit or implicit indication of the presence of one or at least two such items.

In principle, the present invention seeks to provide a controller and an isolated power converter, which provides high charging efficiency and is immune from the influence of a switching frequency and thus less sensitive to an output voltage.

Figure 1:
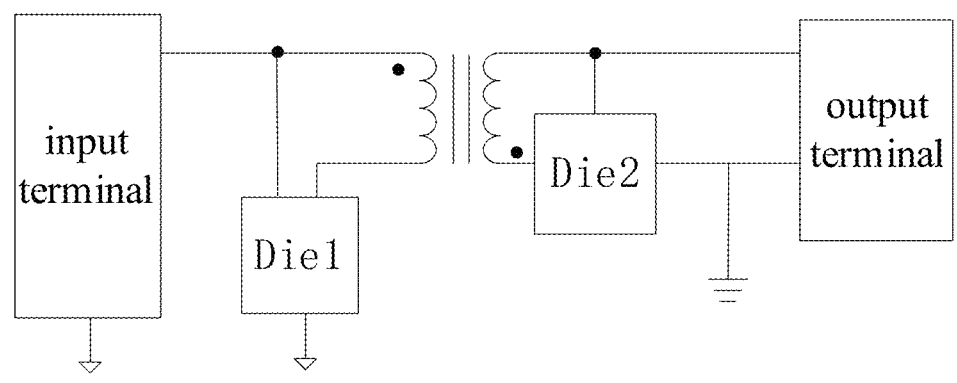
FIG. 1 is a schematic illustration of an isolated power converter.
Figure 2A:
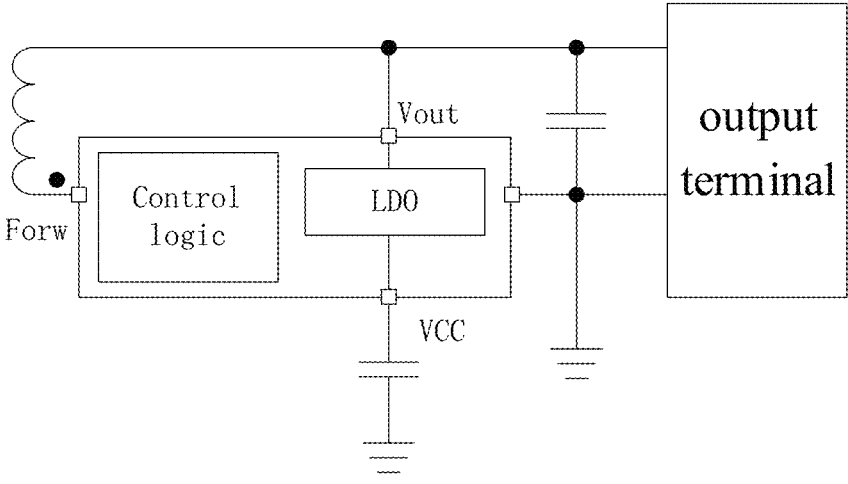
FIG. 2a schematically illustrates a circuit for supplying power to a second IC chip of FIG. 1.
Figure 2B:
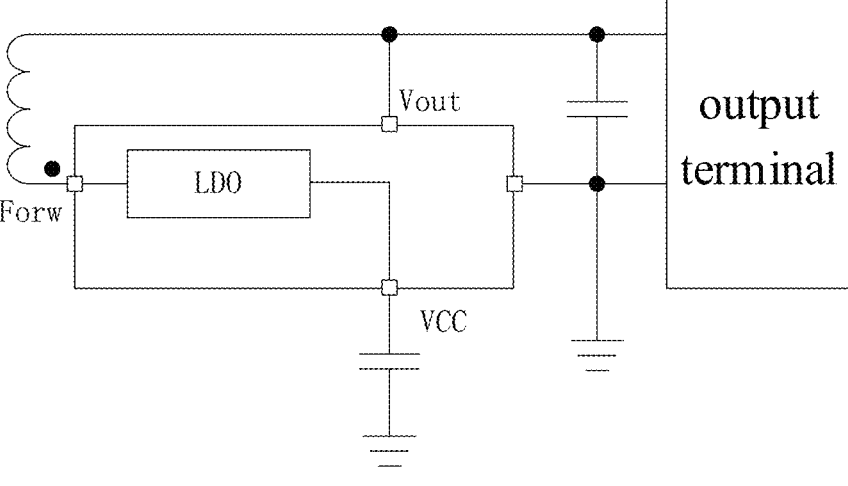
FIG. 2b schematically illustrates a circuit for supplying power to the second IC chip of FIG. 1.
Figure 2C:
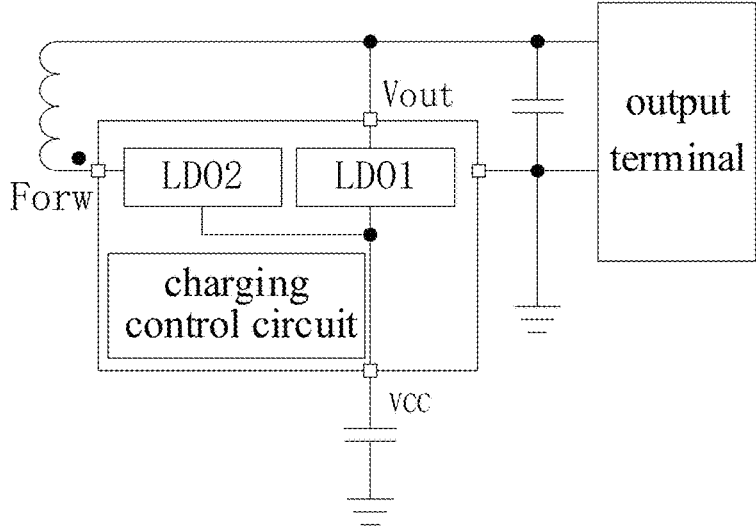
FIG. 2c schematically illustrates a circuit for supplying power to the second IC chip of FIG. 1.
Figure 3:
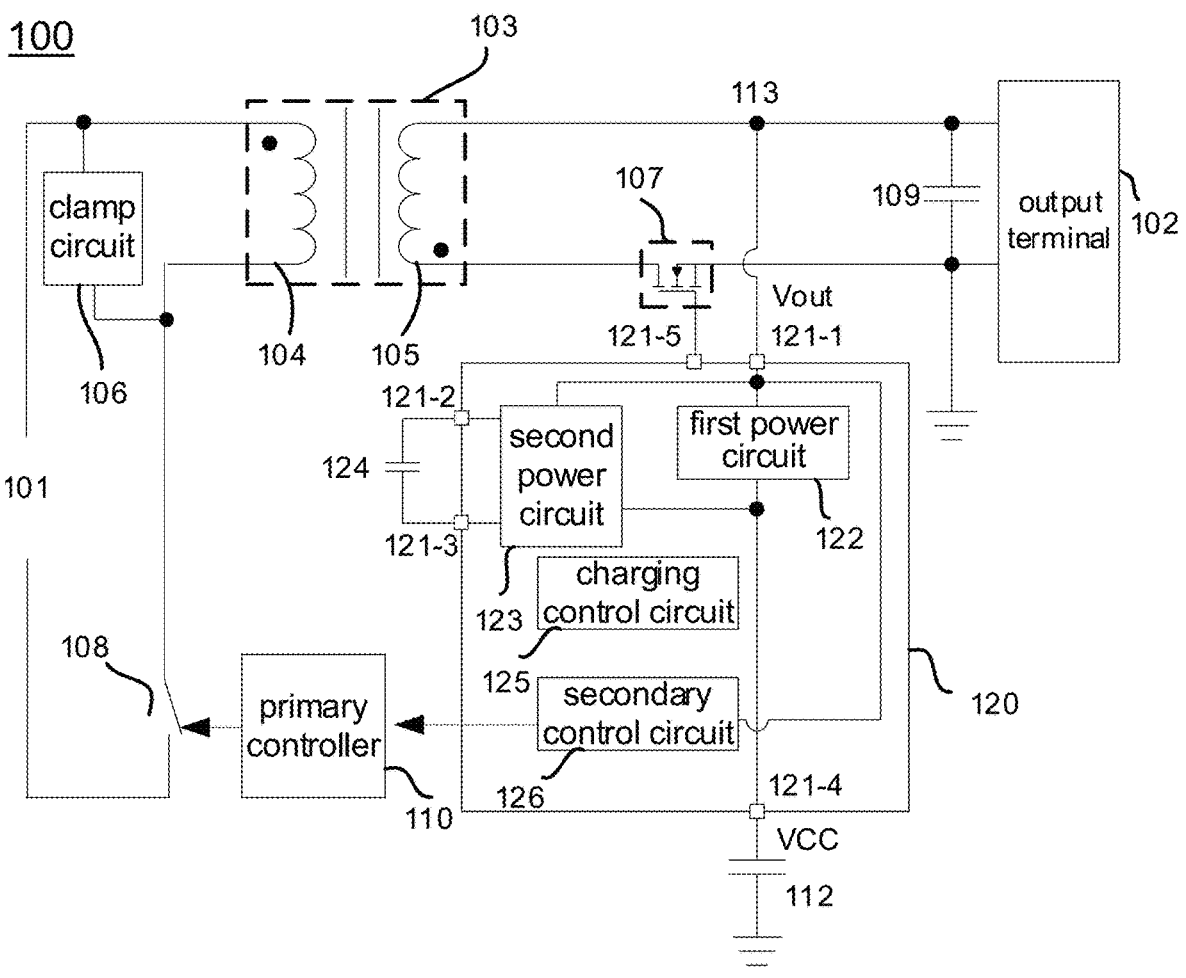
FIG. 3 schematically illustrates an isolated power converter according to an embodiment of the present invention.

FIG. 3 schematically illustrates an isolated power converter according to an embodiment of the present invention. Referring to FIG. 3, the isolated power converter 100 includes an input terminal 101 and an output terminal 102. The input terminal 101 is coupled to receive an input voltage, which may be an AC voltage that has been rectified and filtered. The output terminal 102 provides an output voltage to an electric load such as a tablet computer. After a startup process of the isolated power converter 100, the output voltage may be regulated to a desired value. There-fore, the output voltage may also be referred to as the "regulated output voltage". The output terminal 102 is coupled to an output capacitor 109 for smoothing the regulated output voltage.

The isolated power converter 100 includes an energy transfer element 103, the energy transfer element 103 includes a primary winding 104 and a secondary winding 105. The energy transfer element 103 is coupled to transfer electric power from the primary winding 104 to the second-ary winding 105. In one example, the energy transfer ele-ment 103 may be a coupled inductor. A circuit electrically coupled between the input terminal 101 and the primary winding 104 may be referred to as a primary side of the isolated power converter 100, and a circuit electrically coupled between the secondary winding 105 and the output terminal 102 may be referred to as a secondary side of the isolated power converter 100. The energy transfer element 103 provides electrical isolation between the primary-side and secondary-side circuits of the isolated power converter 100.

The isolated power converter 100 further includes a primary-side controller 110 (referred to hereinafter as the "primary controller 110"), a secondary-side controller 120 ("secondary controller 120") and a power switch 108, which may be all included in an integrated circuit (IC) package.

In one example, in the IC package, first and second IC chips may be encapsulated in an encapsulation body. The encapsulation body may be an enclosure or plastic film that wraps or encloses one or more IC chips and part of a lead frame. The first IC chip may include the primary controller 110 and the power switch 108, and the second IC chip may include the secondary controller 120.

In an alternative example, the IC package may include a first IC chip including the power switch 108, a second IC chip including the primary controller 110 and a third circuit chip including the secondary controller 120.

The chip including the primary controller 110 and the chip including the secondary controller 120 may be galvanically isolated from each other. In this way, the secondary con-troller 120 is galvanically isolated from the primary con-troller 110 and the power switch 108. Although the primary controller 110, the secondary controller 120 and the power switch 108 have been exemplified as being included in a single IC package, in other examples, one or more of the primary controller 110, the secondary controller 120 and the power switch 108 may be arranged outside the IC package. For example, the power switch 108 may be included in an IC package, which is separate from another IC package including both the primary controller 110 and the secondary controller 120.

The primary controller 110 is coupled to primary-side circuit components in the isolated power converter 100, such as the power switch 108. The secondary controller 120 is coupled to secondary-side circuit components in the isolated power converter 100. For example, the secondary controller 120 may be coupled to the secondary winding 105, the output terminal 102, a bypass capacitor 112, a synchronous rectification circuit 107 and other circuit components. The primary controller 110 and the secondary controller 120 control the circuitry of the isolated power converter 100 and hence energy transfer from the input terminal 101 to the output terminal 102.

Although the primary controller 110 and the secondary controller 120 are galvanically isolated from each other, the secondary controller 120 can transfer a signal to the primary controller 110 in an isolated manner. The power switch 108 may be a high-voltage power switch. In one embodiment, the power switch 108 may be a power metal-oxide-semi-conductor field-effect transistor (MOSFET). During opera-tion, the primary controller 110 controls a current through the power switch 108 and the primary winding 104. In general, the power switch 108 may be in an ON state (e.g., serving as a turned-on switch) or an OFF state (e.g., as a turned-off switch), depending on a switch drive signal generated by the primary controller 110. When in the ON state, the power switch 108 can conduct a current. When the power switch 108 is in the OFF state, a voltage is applied to two terminals of the power switch 108, and the power switch 108 dose not conduct a current.

The clamp circuit 106 is coupled to the primary winding 104 in the energy transfer element 103. As a result, a maximum voltage on the power switch 108 can be limited during transitions of the power switch 108 between the ON and OFF states. In one example, in response to a transition of the power switch 108 from the ON state to the OFF state, the synchronous rectification circuit 107 is turned on under the control of the secondary controller 120, allowing effi-cient charging of the output capacitor 109.

The secondary controller 120 transmits an enable signal to the primary controller 110, thereby providing the primary controller 110 with an indication of how to switch the power switch 108. In response to the enable signal, the primary controller 110 generates a switch drive signal that drives the power switch 108. The secondary controller 120 may gen-erate the enable signal based on a sensed output of the isolated power converter 100.

Figure 4:
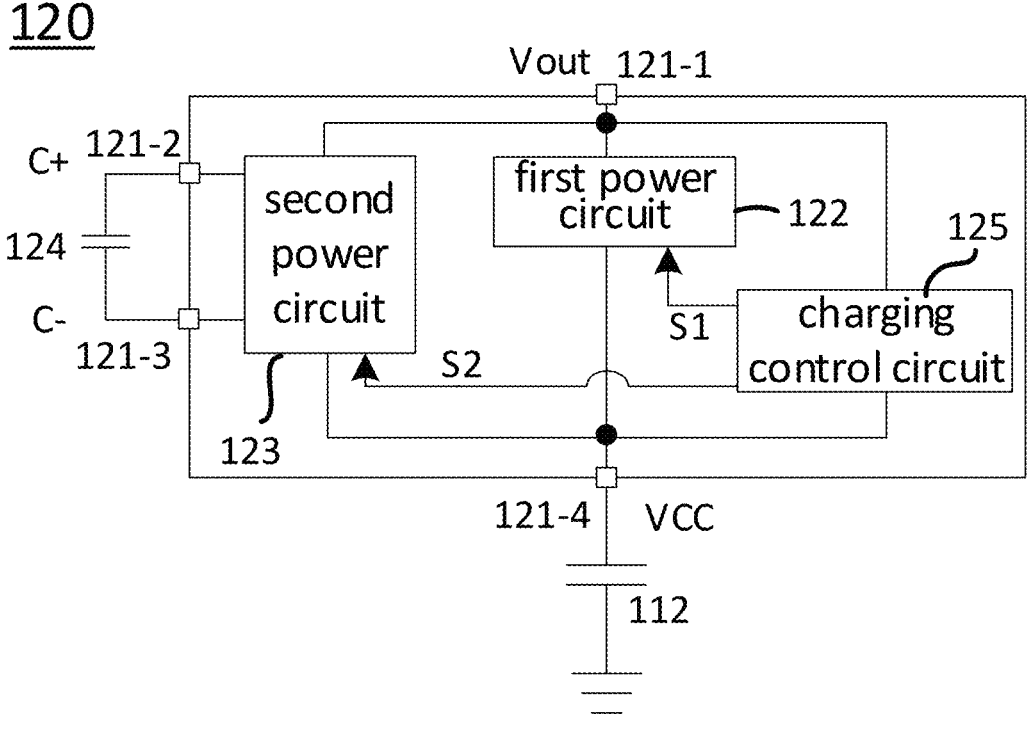
FIG. 4 schematically illustrates a controller according to an embodiment of the present invention.

FIG. 4 schematically illustrates a controller according to an embodiment of the present invention. Referring to FIGS. 3 and 4, the controller (i.e., the aforementioned secondary controller 120) includes a bypass terminal 121-4 coupled to the bypass capacitor 112, the bypass capacitor 112 is coupled to the secondary side of the isolated power converter 100.

The secondary controller 120 further includes a first power circuit 122 coupled to both the bypass terminal 121-4 and a first terminal 121-1. The first terminal 121-1 is coupled to a secondary-side node 113, and the first power circuit 122 is coupled to transfer electric charge from the first terminal 121-1 to the bypass terminal 121-4 so that the electric charge is stored in the bypass capacitor 112.

The secondary controller 120 further includes a second power circuit 123 coupled to the first terminal 121-1, a second terminal 121-2 and a third terminal 121-3. The second terminal 121-2 and the third terminal 121-3 are respectively coupled to two terminals of a flying capacitor 124, and the second power circuit 123 is coupled to transfer electric charge from the first terminal 121-1 to the flying capacitor 124 and to transfer electric charge from the flying capacitor 124 to the bypass terminal 121-4 so that the electric charge is stored in the bypass capacitor 112.

The secondary controller 120 further includes a charging control circuit 125, which is coupled to control the first power circuit 122 or the second power circuit 123 to transfer electric charge to the bypass terminal 121-4 in response to at least one of a bypass voltage VCC at the bypass terminal 121-4 and a voltage Vout at the first terminal 121-1.

The secondary controller 120 includes multiple terminals connected to the secondary-side circuit, such as the first terminal 121-1, the second terminal 121-2, the third terminal 121-3, the bypass terminal 121-4 and a fourth terminal 121-5. The first terminal 121-1 is coupled to the secondary-side node 113. The second terminal 121-2 and the third terminal 121-3 are coupled to the flying capacitor 124. The bypass terminal 121-4 is coupled to the bypass capacitor 112. The fourth terminal 121-5 is coupled to the synchronous rectification circuit 107.

In this embodiment, the secondary-side node 113 is an output node of the isolated power converter 100, at which the regulated output voltage is output. Moreover, the voltage Vout at the first terminal 121-1 reflects the regulated output voltage. One terminal of the bypass capacitor 112 is coupled to the bypass terminal 121-4, and another terminal is grounded.

The charging control circuit 125 is coupled to the first power circuit 122 and the second power circuit 123, and is configured to provide a first control signal S1 to the first power circuit 122 and to provide a second control signal S2 to the second power circuit 123. When the first control signal S1 is a valid signal, the first power circuit 122 transfers electric charge from the first terminal 121-1 to the bypass terminal 121-4. When the second control signal S2 is a valid signal, the second power circuit 123 transfers electric charge from the first terminal 121-1 to the bypass terminal 121-4.

Figure 5A:
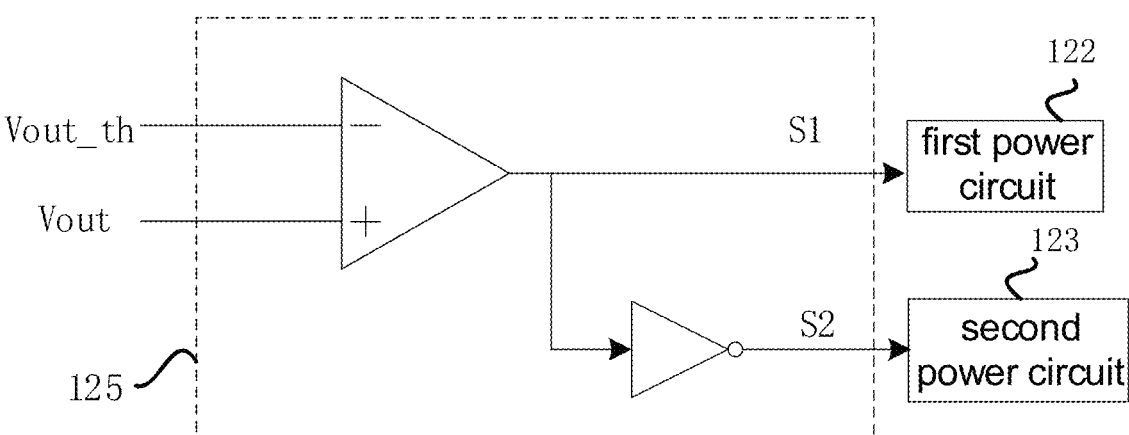
FIG. 5a schematically illustrates a charging control circuit according to an embodiment of the present invention.

FIG. 5a schematically illustrates one embodiment of the charging control circuit. Referring to FIG. 5a, the charging control circuit 125 incudes a comparator and a NOT gate. The output voltage Vout at the first terminal is input to a positive input terminal of the comparator, and a first threshold voltage Vout_th is input to a negative input terminal of the comparator. The first control signal S1 is output from an output terminal of the comparator to the first power circuit 122. Moreover, the output terminal of the comparator is connected to an input terminal of the NOT gate, and the second control signal S2 is output from an output terminal of the NOT gate to the second power circuit 123.

The charging control circuit 125 is coupled to control the first power circuit 122 or the second power circuit 123 to transfer electric charge to the bypass terminal 121-4, in response to a result of comparison made between the output voltage Vout at the first terminal and the first threshold voltage Vout_th. For example, when the output voltage Vout at the first terminal is higher than the first threshold voltage Vout_th, the first power circuit 122 transfers electric charge from the first terminal 121-1 to the bypass terminal 121-4; or when the output voltage Vout at the first terminal is lower than the first threshold voltage Vout_th, the second power circuit 123 transfers electric charge from the first terminal 121-1 to the bypass terminal 121-4.

Figure 5B:
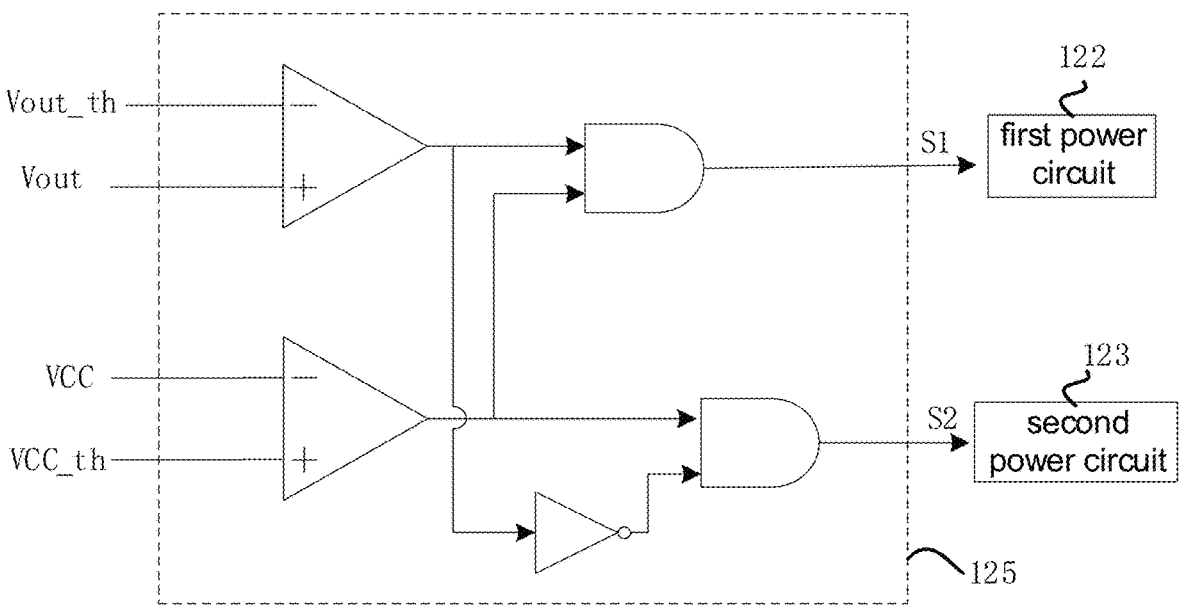
FIG. 5b schematically illustrates a charging control circuit according to another embodiment of the present invention.

FIG. 5b schematically illustrates another embodiment of the charging control circuit. Referring to FIG. 5b, the charging control circuit 125 includes two comparators, two AND gates and one NOT gate. The output voltage Vout at the first terminal 121-1 is input to a positive input terminal of a first one of the comparators, and the first threshold voltage Vout_th is input to a negative input terminal of the first comparator. An output terminal of the first comparator is connected to an input terminal of a first one of the AND gates and an input terminal of the NOT gate. The bypass voltage VCC at the bypass terminal 121-4 is input to a negative input terminal of a second one of the comparators, and a second threshold voltage VCC_th is input to a positive input terminal of the second comparator. An output terminal of the second comparator is connected to another input terminal of the first AND gate and an input terminal of a second one of the AND gates. The first control signal S1 is output from an output terminal of the first AND gate to the first power circuit 122, and an output terminal of the NOT gate is connected to another input terminal of the second AND gate. The second control signal S2 is output from an output terminal of the second AND gate to the second power circuit 123.

The charging control circuit 125 is coupled to control the first power circuit 122 or the second power circuit 123 to transfer electric charge to the bypass terminal 121-4 in response to a result of comparison made between the output voltage Vout at the first terminal 121-1 and the first threshold voltage Vout_th and to a result of comparison made between the bypass voltage VCC at the bypass terminal 121-4 and the second threshold voltage VCC_th. For example, when the output voltage Vout at the first terminal 121-1 is higher than the first threshold voltage Vout_th, and when the bypass voltage VCC at the bypass terminal 121-4 is lower than the second threshold voltage VCC_th, the first power circuit 122 transfers electric charge from the first terminal 121-1 to the bypass terminal 121-4. Moreover, when the output voltage Vout at the first terminal 121-1 is lower than the first threshold voltage Vout_th, and when the bypass voltage VCC at the bypass terminal 121-4 is lower than the second threshold voltage VCC_th, the second power circuit 123 transfers electric charge from the first terminal 121-1 to the bypass terminal 121-4.

With continued reference to FIG. 3, the controller further includes a secondary control circuit 126, which is coupled to the first terminal 121-1 and configured to transmit a voltage signal present at the first terminal 121-1 to the primary side of the isolated power converter 100. In one example, the first terminal 121-1 is coupled to the secondary-side node 113, which is an output node of the isolated power converter 100, at which the regulated output voltage is output. Moreover, the voltage at the first terminal 121-1 is the regulated output voltage. The secondary control circuit 126 is coupled to the first terminal 121-1 and thereby able to receive a feedback signal representing an output parameter of the isolated power converter 100. In response to the feedback signal, the secondary control circuit 126 can generate the enable signal and transmit it to the primary controller 110. The primary controller 110 is coupled to receive the enable signal and controls the power switch 108 in response to the enable signal to adjust energy transferred from the primary side to the secondary side.

In a non-limiting example, the first power circuit 122 is a low dropout regulator (LDO), and the second power circuit 123 is a charge pump consisting of capacitors and switches. In another example, the secondary controller 120 may further include a third power circuit (not shown) coupled between the first terminal 121-1 and the second power circuit 123. The third power circuit is, for example, an LDO configured for voltage regulation.

FIG. 6 schematically illustrates a power supply process during startup of the isolated power converter according to an embodiment of the present invention. During startup, it may be assumed that the bypass voltage VCC is relatively low (e.g., almost 0 V) because the bypass capacitor 112 is initially not charged at all, or minimally charged. Therefore, during startup, bypass capacitor 112 may be not able to provide sufficient power required by normal operation of circuits in the secondary controller 120 (such as the charging control circuit 125).

Referring to FIG. 6, during startup, in step 202 following step 201, the isolated power converter 100 is coupled to an AC power source so that the input voltage is provided to the input terminal 101. In step 203, the primary controller 110 receives power from the input voltage. In step 204, the primary controller 110 starts switching the power switch 108 between the ON and OFF states and thereby transferring energy to the secondary side of the isolated power converter 100. In step 205, the output capacitor 109 starts being charged, causing a voltage thereon to rise. In step 206, the secondary controller 120 transfers electric charge from the first terminal 121-1 through the second power circuit 123 to the bypass terminal 121-4 to charge the bypass capacitor 112. In step 207, the bypass capacitor 112 is charged to a rated voltage VCC_UVL0. In step 208, the secondary controller 120 determines whether the output voltage Vout at the first terminal 121-1 exceeds the first threshold voltage Vout_th. If the output voltage Vout at the first terminal 121-1 is not higher than the first threshold voltage Vout_th (i.e., "No"), then the secondary controller 120 continues transferring electric charge from the first terminal 121-1 through the second power circuit 123 to the bypass terminal 121-4 to charge the bypass capacitor 112. If the output voltage Vout at the first terminal 121-1 is higher than the first threshold voltage Vout_th (i.e., "Yes"), step 209 is carried out, in which the secondary controller 120 starts transferring electric charge from the first terminal 121-1 through the first power circuit 122 to the bypass terminal 121-4 to charge the bypass capacitor 112. In step 210, the process ends.

Figure 7A:
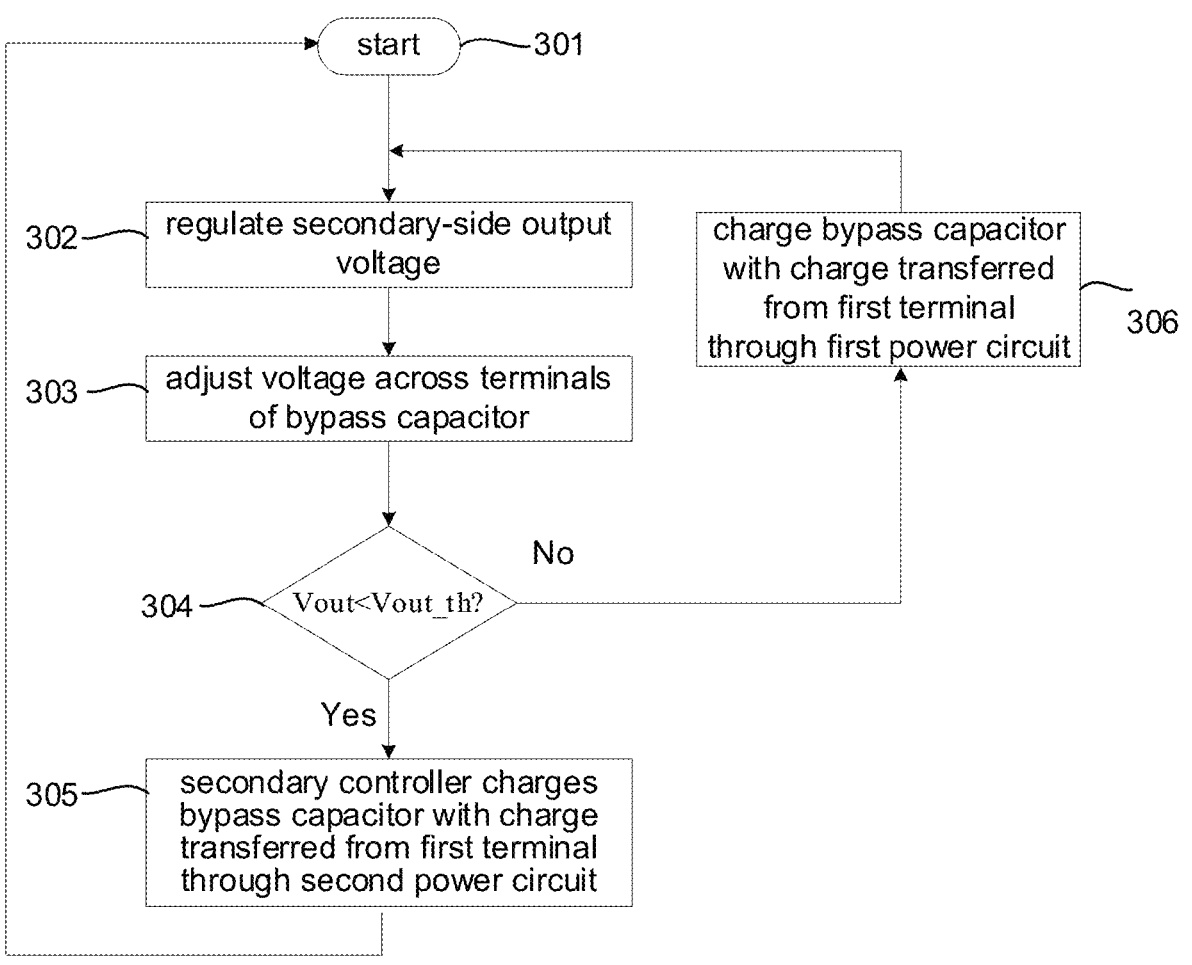
FIG. 7a schematically illustrates a power supply process during output voltage regulation of an isolated power converter according to an embodiment of the present invention.

FIG. 7a schematically illustrates a power supply process during output voltage regulation of the isolated power converter according to an embodiment of the present invention. The power supply process of FIG. 7a corresponds to the charging control circuit of FIG. 5a. Referring to FIG. 7a, in step 302 following step 301, the isolated power converter 100 regulates the secondary-side output voltage to the desired value, i.e., the regulated output voltage. In step 303, the secondary controller 120 adjusts a voltage across two terminals of the bypass capacitor 112 by charging the bypass capacitor 112. In step 304, it is determined whether the output voltage Vout at the first terminal 121-1 is lower than the first threshold voltage Vout_th. If the output voltage Vout at the first terminal 121-1 is lower than the first threshold voltage Vout_th ("Yes"), step 305 is performed, in which the secondary controller 120 transfers electric charge from the first terminal 121-1 through the second power circuit 123 to the bypass terminal 121-4 to charge the bypass capacitor 112. If the output voltage Vout at the first terminal 121-1 is not lower than the first threshold voltage Vout_th ("No"), step 306 is performed, in which the secondary controller 120 transfers electric charge from the first terminal 121-1 through the first power circuit 122 to the bypass terminal 121-4 to charge the bypass capacitor 112.

Figure 7B:
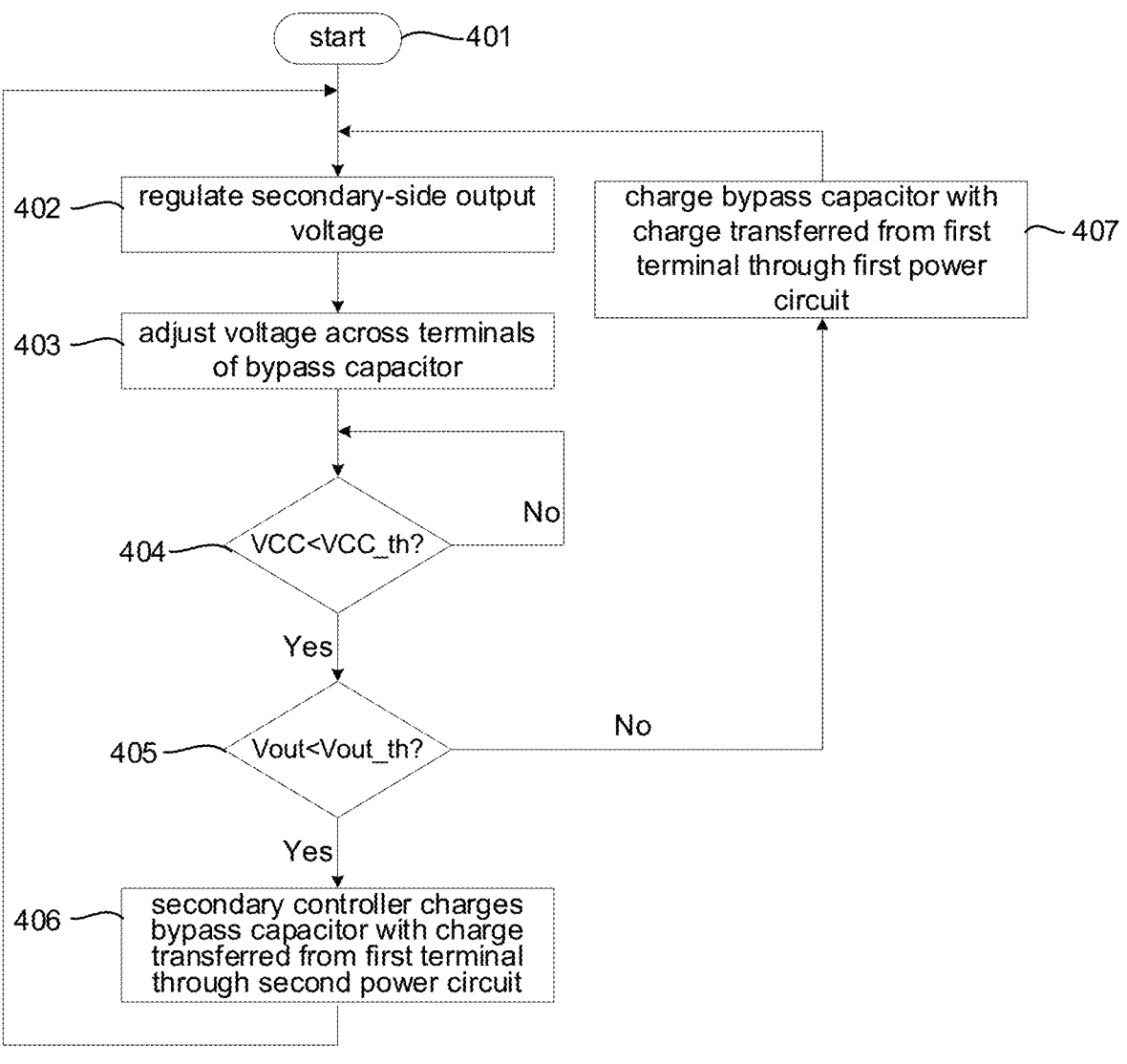
FIG. 7b schematically illustrates a power supply process during output voltage regulation of an isolated power converter according to another embodiment of the present invention In these figures: 100—isolated power converter; 101—input terminal; 102—output terminal; 103—energy transfer element; 104—primary winding; 105—secondary winding; 106—clamp circuit; 107—synchronous rectification circuit; 108—power switch; 109—output capacitor; 110—primary controller; 112—bypass capacitor; 120—secondary controller; 121-1—first terminal; 121-2—second terminal; 121-3—third terminal; 121-4—bypass terminal; 121-5—fourth terminal; 122—first power circuit; 123—second power circuit; 124—flying capacitor; 125—charging control circuit; 126—secondary control circuit.

FIG. 7b schematically illustrates a power supply process during output voltage regulation of the isolated power converter according to another embodiment of the present invention. The power supply process of FIG. 7b corresponds to the charging control circuit of FIG. 5b. Referring to FIG. 7b, in step 402 following step 401, the isolated power converter 100 regulates the output voltage to the desired value, i.e., the regulated output voltage. In step 403, the secondary controller 120 adjusts a voltage across the two terminals of the bypass capacitor 112 by charging the bypass capacitor 112. In step 404, it is determined whether the bypass voltage VCC is lower than the second threshold voltage VCC_th. If the bypass voltage VCC is not lower than the second threshold voltage VCC_th ("No"), operation of step 404 is continued. If the bypass voltage VCC is lower than the second threshold voltage VCC_th ("Yes"), step 405 is carried out, in which it is determined whether the output voltage Vout at the first terminal 121-1 is lower than the first threshold voltage Vout_th. If the output voltage Vout at the first terminal 121-1 is lower than the first threshold voltage Vout_th ("Yes"), step 406 is carried out, in which the secondary controller 120 transfers electric charge from the first terminal 121-1 through the second power circuit 123 to the bypass terminal 121-4 to charge the bypass capacitor 112. If the voltage Vout at the first terminal 121-1 is not lower than the first threshold voltage Vout_th ("No"), step 407 is carried out, in which the secondary controller 120 transfers electric charge from the first terminal 121-1 through the first power circuit 122 to the bypass terminal 121-4 to charge the bypass capacitor 112.

In summary, the present invention provides a controller and an isolated power converter. The controller includes a bypass terminal coupled to a bypass capacitor, which is in turn coupled to a secondary side of the isolated power converter. The controller also includes a first power circuit coupled to the bypass terminal and a first terminal. The first terminal is coupled to a secondary-side node, and the first power circuit is coupled to transfer electric charge from the first terminal to the bypass terminal so that it is stored in the bypass capacitor. The controller further includes a second power circuit coupled to the first terminal, a second terminal and a third terminal. The second terminal and the third terminal are respectively coupled to two terminals of a flying capacitor, and the second power circuit is coupled to transfer electric charge from the first terminal to the flying capacitor and from the flying capacitor to the bypass terminal so that it is stored in the bypass capacitor. The controller further includes a charging control circuit, which is coupled to control the first or second power circuit to transfer electric charge to the bypass terminal, in response to at least one of a bypass voltage generated at the bypass terminal and a voltage at the first terminal. According to the present invention, the charging control circuit transfers electric charge from the first terminal to the bypass terminal selectively through the first or second power circuit so that it is stored in the bypass capacitor to supply power to the controller. This enables high charging efficiency, eliminates the influence of switching frequency variation during startup and operation of the isolated power converter, and reduces sensitivity to the output voltage.

The description presented above is merely that of a few preferred embodiments of the present invention and is not intended to limit the scope thereof in any sense. Any and all changes and modifications made by those of ordinary skill in the art based on the above teachings fall within the scope of the invention.

The invention claimed is:

1. A controller, comprising:
a bypass terminal coupled to a bypass capacitor, wherein the bypass capacitor is coupled to a secondary side of an isolated power converter;
a first power circuit coupled to the bypass terminal and a first terminal, the first terminal coupled to a node of the secondary side of the isolated power converter, the first power circuit coupled to transfer electric charge from the first terminal to the bypass terminal so that the electric charge is stored in the bypass capacitor;
a second power circuit coupled to the first terminal, a second terminal and a third terminal, the second terminal and the third terminal respectively coupled two terminals of a flying capacitor, the second power circuit coupled to transfer the electric charge from the first terminal to the flying capacitor and from the flying capacitor to the bypass terminal so that the electric charge is stored in the bypass capacitor; and
a charging control circuit, which is coupled to control the first or second power circuit to transfer the electric charge to the bypass terminal in response to at least one of a bypass voltage at the bypass terminal and a voltage at the first terminal.

2. The controller according to claim 1, wherein the node of the secondary side is an output node of the isolated power converter, at which a regulated output voltage is output, and the voltage at the first terminal reflects the regulated output voltage.

3. The controller according to claim 1, wherein the charging control circuit is coupled to provide a first control signal to the first power circuit; the charging control circuit is coupled to provide a second control signal to the second power circuit; when the first control signal is a valid signal, the first power circuit transfers the electric charge to the bypass terminal; and when the second control signal is a valid signal, the second power circuit transfers the electric charge to the bypass terminal.

4. The controller according to claim 3, wherein the charging control circuit comprises a comparator and a NOT gate; the voltage at the first terminal is input to a positive input terminal of the comparator; a first threshold voltage is input to a negative input terminal of the comparator; the first control signal is output from an output terminal to the first power circuit, which is connected to an input terminal of the NOT gate; and the second control signal is output from an output terminal of the NOT gate to the second power circuit.

5. The controller according to claim 4, wherein the charging control circuit is coupled to control the first or second power circuit to transfer the electric charge to the bypass terminal in response to a result of comparison made between the voltage at the first terminal and the first threshold voltage.

6. The controller according to claim 5, wherein when the voltage at the first terminal is higher than the first threshold voltage, the first power circuit transfers the electric charge from the first terminal to the bypass terminal, or when the voltage at the first terminal is lower than the first threshold voltage, the second power circuit transfers the electric charge from the first terminal to the bypass terminal.

7. The controller according to claim 3, wherein the charging control circuit comprises first and second comparators, first and second AND gates and one NOT gate; the voltage at the first terminal is input to a positive input terminal of the first comparator; the first threshold voltage is input to a negative input terminal of the first comparator; an output terminal of the first comparator is connected to an input terminal of the first AND gate and to an input terminal of the NOT gate; the bypass voltage is input to a negative input terminal of the second comparator; a second threshold voltage is input to a positive input terminal of the second comparator; an output terminal of the second comparator is connected to another input terminal of the first AND gate and an input terminal of the second AND gate; the first control signal is output from an output terminal of the first AND gate to the first power circuit; an output terminal of the NOT gate is connected to another input terminal of the second AND gate; and the second control signal is output from an output terminal of the second AND gate to the second power circuit.

8. The controller according to claim 7, wherein the charging control circuit is coupled to control the first or second power circuit to transfer the electric charge to the bypass terminal in response to a result of comparison made between the voltage at the first terminal and the first threshold voltage and to a result of comparison made between the bypass voltage at the bypass terminal and the second threshold voltage.

9. The controller according to claim 8, wherein when the voltage at the first terminal is higher than the first threshold voltage and when the bypass voltage is lower than the second threshold voltage, the first power circuit transfers the electric charge from the first terminal to the bypass terminal; or when the voltage at the first terminal is lower than the first threshold voltage and when the bypass voltage is lower than the second threshold voltage, the second power circuit transfers the electric charge from the first terminal to the bypass terminal.

10. The controller according to claim 1, further comprising a secondary control circuit, which is coupled to the first terminal to transmit a voltage signal at the first terminal to a primary side of the isolated power converter.

11. The controller according to claim 1, further comprising a third power circuit coupled between the first terminal and the second power circuit, wherein the third power circuit is a low dropout regulator configured for voltage regulation.

12. The controller according to claim 1, wherein one terminal of the bypass capacitor is coupled to the bypass terminal, and another terminal is grounded.

13. An isolated power converter, comprising the controller of claim 1.

14. The isolated power converter according to claim 13, further comprising an energy transfer element, the energy transfer element comprising a primary winding and a secondary winding, wherein the energy transfer element is coupled to transfer electric power from the primary winding to the secondary winding.

15. The isolated power converter according to claim 14, further comprising a synchronous rectification circuit, the controller further comprising a fourth terminal coupled to the synchronous rectification circuit.

\* \* \* \* \*